US011978942B2

(12) United States Patent
Jia et al.

(10) Patent No.: US 11,978,942 B2
(45) Date of Patent: May 7, 2024

(54) FEEDING STRUCTURE, MICROWAVE RADIO FREQUENCY DEVICE AND ANTENNA

(71) Applicants: BEIJING BOE SENSOR TECHNOLOGY CO., LTD., Beijing (CN); BOE TECHNOLOGY GROUP CO., LTD., Beijing (CN)

(72) Inventors: Haocheng Jia, Beijing (CN); Tienlun Ting, Beijing (CN); Ying Wang, Beijing (CN); Jie Wu, Beijing (CN); Liang Li, Beijing (CN); Cuiwei Tang, Beijing (CN); Qiangqiang Li, Beijing (CN); Chuncheng Che, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 421 days.

(21) Appl. No.: 17/414,176

(22) PCT Filed: Oct. 23, 2020

(86) PCT No.: PCT/CN2020/123115

§ 371 (c)(1),
(2) Date: Jun. 15, 2021

(87) PCT Pub. No.: WO2021/088663

PCT Pub. Date: May 14, 2021

(65) Prior Publication Data

US 2022/0045413 A1 Feb. 10, 2022

(30) Foreign Application Priority Data

Nov. 4, 2019 (CN) ......................... 201911065017.4

(51) Int. Cl.

| | |
|---|---|
| ***H01Q 1/48*** | (2006.01) |
| ***H01P 1/18*** | (2006.01) |
| ***H01P 3/00*** | (2006.01) |

(52) U.S. Cl.

CPC ................ *H01P 3/00* (2013.01); *H01P 1/182* (2013.01)

(58) Field of Classification Search

CPC ............ H01Q 1/48; H01Q 3/36; H01Q 9/045; H01Q 9/0414; H01Q 21/065; H01P 1/182;

(Continued)

(56) References Cited

U.S. PATENT DOCUMENTS 5,061,939 A * 10/1991 Nakase ................ H01Q 1/3275 343/846
7,298,229 B1 11/2007 Ruelke (Continued)

FOREIGN PATENT DOCUMENTS

CN 1967932 A 5/2007
CN 101533944 A 9/2009

(Continued)

OTHER PUBLICATIONS

Master Dissertation, University of Electronic Science and Technology of China; 2012.

(Continued)

*Primary Examiner* — Tung X Le
(74) *Attorney, Agent, or Firm* — Nath, Goldberg & Meyer; Joshua B. Goldberg

(57) ABSTRACT

A feeding structure is provided. The feeding structure includes a feeding unit, which includes: a reference electrode, first and second substrates opposite to each other, and a dielectric layer between the first and second substrates. The first substrate includes a first base plate and a first electrode thereon. The first electrode includes a first main body and a plurality of first branches connected to the first main body and spaced apart from each other. The second substrate includes a second base plate and a second electrode (Continued)

thereon. The second electrode includes a second main body and a plurality of second branches, which are connected to the second main body, spaced apart from each other, and in one-to-one correspondence with the plurality of first branches. Orthographic projections of each second branch and a corresponding first branch on the first base plate partially overlap each other.

20 Claims, 6 Drawing Sheets

(58) Field of Classification Search
CPC ........ H01P 1/184; H01P 1/187; H01P 1/2039; H01P 3/00; H01P 5/187
See application file for complete search history.

(56) References Cited

U.S. PATENT DOCUMENTS

| | | | | |
|---|---|---|---|---|
| 8,816,912 | B2 * | 8/2014 | Rajgopal | H01Q 9/0407 343/702 |
| 11,158,948 | B2 * | 10/2021 | Lee | H01Q 5/335 |
| 11,223,132 | B2 * | 1/2022 | Kaushal | H01Q 21/065 |
| 2011/0199166 | A1 | 8/2011 | Carrillo-Ramirez | |
| 2013/0321093 | A1 | 12/2013 | Ueda et al. | |
| 2014/0125427 | A1 | 5/2014 | Moon et al. | |
| 2016/0241217 | A1 * | 8/2016 | Sazegar | G02F 1/13306 |
| 2018/0138593 | A1 * | 5/2018 | Nakazawa | H01Q 3/46 |
| 2020/0112106 | A1 * | 4/2020 | Misaki | H01Q 21/065 |

FOREIGN PATENT DOCUMENTS

| | | | |
|---|---|---|---|
| CN | 201478429 | U | 5/2010 |
| CN | 20174992 | U | 2/2011 |
| CN | 202067886 | U | 12/2011 |
| CN | 104993205 | A | 10/2015 |
| CN | 108134177 | A | 6/2018 |
| CN | 109301424 | A | 2/2019 |
| CN | 208654481 | U | 3/2019 |
| CN | 110299593 | A | 10/2019 |
| IN | 201845849 | U | 5/2011 |

OTHER PUBLICATIONS

Chinese First Office Action dated Jun. 2, 2021 corresponding to application No. 201911065017.4.

* cited by examiner

FEEDING STRUCTURE, MICROWAVE RADIO FREQUENCY DEVICE AND ANTENNA

CROSS REFERENCE TO RELATED APPLICATIONS

This is a National Phase Application filed under 35 U.S.C. 371 as a national stage of PCT/CN2020/123115, filed Oct. 23, 2020, an application claiming the benefit of Chinese Application No. 201911065017.4, filed Nov. 4, 2019, the content of each of which is hereby incorporated by reference in its entirety.

TECHNICAL FIELD

The present disclosure relates to the field of communication technologies, and in particular to a feeding structure, a microwave radio frequency device, and an antenna.

BACKGROUND

A phase shifter is a device for adjusting (or changing) a phase of a electromagnetic wave, and is widely applied to various communication systems such as a satellite communication system, a phased array radar, a remote sensing and telemetry system, and the like. The phase shifter with an adjustable dielectric constant (i.e., an adjustable permittivity) is a phase shifter for realizing a phase shifting effect by adjusting a dielectric constant of a dielectric layer of this phase shifter. A traditional phase shifter with an adjustable dielectric constant adopts a single-line transmission structure, and realizes the phase shifting effect by adjusting a phase speed of a signal.

SUMMARY

A first aspect of the present disclosure provides a feeding structure including a feeding unit, the feeding unit including: a reference electrode, a first substrate and a second substrate opposite to each other, and a dielectric layer between the first substrate and the second substrate, wherein the first substrate includes a first base plate and a first electrode on the first base plate; the first electrode includes a first main body and a plurality of first branches, the plurality of first branches are connected to the first main body and spaced apart from each other in a lengthwise direction of the first main body, and both ends of the first main body are an input terminal and a straight-through terminal, respectively;

the second substrate includes a second base plate and a second electrode on the second base plate; the second electrode includes a second main body and a plurality of second branches, the plurality of second branches are connected to the second main body, spaced apart from each other in a lengthwise direction of the second main body, and in one-to-one correspondence with the plurality of first branches; an orthographic projection of each second branch on the first base plate partially overlaps an orthographic projection of a corresponding first branch on the first base plate; both ends of the second main body are a coupling terminal and an isolation terminal, respectively, and the isolation terminal is provided with a matching impedance;

the input terminal of the first main body allows a portion of a microwave signal to be output from the straight-through terminal, and another portion of the microwave signal to be coupled to the plurality of second branches via the plurality of first branches; the matching impedance is for controlling at least a part of the portion of the microwave signal coupled to the plurality of second branches to be output from the coupling terminal; and the reference electrode forms a current loop with the first electrode and the second electrode, respectively.

In an embodiment, the feeding unit includes a branch overlapping region and a no-coupling double-line region;

the plurality of first branches and the plurality of second branches are all in the branch overlapping region;

the first main body and the second main body both extend through the branch overlapping region and the no-coupling double-line region, a portion of the first main body in the branch overlapping region has a length equal to a length of a portion of the first main body in the no-coupling double-line region, and a portion of the second main body in the branch overlapping region has a length equal to a length of a portion of the second main body in the no-coupling double-line region; and the portion of the second main body in the no-coupling double-line region has an impedance equal to the matching impedance.

In an embodiment, impedances of branch circuits formed by the plurality of first branches and the plurality of second branches respectively overlapping the plurality of first branches are sequentially decreased in a direction from the input terminal to the straight-through terminal.

In an embodiment, the plurality of first branches and the plurality of second branches have a same width; and in a direction from the input terminal to the straight-through terminal, a distance between any adjacent two of the plurality of first branches is a fixed value, and overlapping areas of the plurality of first branches and the plurality of second branches are sequentially increased.

In an embodiment, each first branch and a corresponding second branch have a same width; and in a direction from the input terminal to the straight-through terminal, a distance between any adjacent two of the plurality of first branches is a fixed value, both widths of the plurality of first branches and widths of the plurality of second branches are sequentially increased, and overlapping lengths of the plurality of first branches and the plurality of second branches are equal to each other.

In an embodiment, the plurality of first branches and the plurality of second branches have a same width; and in a direction from the input terminal to the straight-through terminal, distances between every pairs of adjacent two of the plurality of first branches are sequentially reduced, and overlapping lengths of the plurality of first branches and the plurality of second branches are equal to each other.

In an embodiment, the feeding structure includes two feeding units each of which is the feeding unit, the two feeding units being cascaded in respective stages, wherein the straight-through terminal of the first main body of a first-stage feeding unit is connected to the input terminal of the first main body of a second-stage feeding unit; and the coupling terminal of the second main body of the first-stage feeding unit is connected to the isolation terminal of the second main body of the second-stage feeding unit.

In an embodiment, the feeding structure further includes a first signal line and a second signal line, wherein the straight-through terminal of the first main body of the first-stage feeding unit is connected to the input terminal of the first main body of the second-stage feeding unit through the first signal line;

the coupling terminal of the second main body of the first-stage feeding unit is connected to the isolation terminal of the second main body of the second-stage feeding unit through the second signal line;

the first main body of the first-stage feeding unit, the first main body of the second-stage feeding unit, and the first signal line are in a same layer and include a same material; and the second main body of the first-stage feeding unit, the second main body of the second-stage feeding unit, and the second signal line are in a same layer and include a same material.

In an embodiment, the feeding structure further includes through holes and a third signal line, wherein the first main body of the second-stage feeding unit is discontinuous at a position overlapping the second signal line;

the through holes are in the first base plate; and the third signal line connects portions, which are spaced apart from each other at the position overlapping the second signal line, of the first main body of the second-stage feeding unit to each other through the through holes.

In an embodiment, the feeding structure further includes a third base plate which is on a side of the first base plate distal to the second base plate and is opposite to the first base plate, wherein the reference electrode is on a side of the third base plate distal to the first base plate.

In an embodiment, the reference electrode is on a side of the first base plate distal to the second base plate.

In an embodiment, the first electrode, the second electrode, and the reference electrode form any one of a microstrip transmission structure, a stripline transmission structure, a coplanar waveguide transmission structure, and a substrate-integrated waveguide transmission structure.

In an embodiment, the feeding structure further includes a support member between the first substrate and the second substrate, for maintaining a distance between the first substrate and the second substrate.

In an embodiment, the dielectric layer includes air or an inert gas.

In an embodiment, the input terminal is an end of the first main body proximal to the plurality of first branches, and the straight-through terminal is an end of the first main body distal to the plurality of first branches; and the coupling terminal is an end of the second main body proximal to the plurality of second branches, and the isolation terminal is an end of the second main body distal to the plurality of second branches.

In an embodiment, the first electrode is between the dielectric layer and the first base plate, and the second electrode is between the dielectric layer and the second base plate.

A second aspect of the present disclosure provides a microwave radio frequency device, which includes the feeding structure according to any one of the foregoing embodiments of the first aspect of the present disclosure.

In an embodiment, the microwave radio frequency device further includes a phase shifting structure, which includes:

- a fourth base plate and a fifth base plate opposite to each other;
- a first transmission line on the fourth base plate;
- a second transmission line on a side of the fifth base plate proximal to the first transmission line;
- a liquid crystal layer between the first transmission line and the second transmission line; and
- a ground electrode on a side of the fourth base plate distal to the first transmission line.

In an embodiment, at least one of the first transmission line and the second transmission line is a microstrip.

In an embodiment, each of the first transmission line and the second transmission line is a comb-shaped electrode, and the ground electrode is a plate-shaped electrode.

In an embodiment, the straight-through terminal of the feeding structure is connected to the first transmission line of the phase shifting structure, and the coupling terminal of the feeding structure is connected to the second transmission line of the phase shifting structure.

In an embodiment, the liquid crystal layer includes positive liquid crystal molecules or negative liquid crystal molecules;

- an angle between a long axis direction of each positive liquid crystal molecule and a plane where the fourth base plate is located is greater than 0 degrees and less than or equal to 45 degrees; and
- an angle between a long axis direction of each negative liquid crystal molecule and the plane where the fourth base plate is located is greater than 45 degrees and less than 90 degrees.

In an embodiment, the microwave radio frequency device includes a phase shifter or a filter.

A third aspect of the present disclosure provides an antenna, which includes the microwave radio frequency device according to any one of the foregoing embodiments of the second aspect of the present disclosure.

DETAILED DESCRIPTION

To enable one of ordinary skill in the art to better understand technical solutions of the present disclosure, the present disclosure will be further described in detail below with reference to the accompanying drawings and exemplary embodiments.

Unless defined otherwise, technical or scientific terms used herein should have the same meaning as commonly understood by one of ordinary skill in the art to which the present disclosure belongs. The terms of "first", "second", and the like used in the present disclosure are not intended to indicate any order, quantity, or importance, but rather are used for distinguishing one element from another. Further, the terms "a", "an", "the", or the like does not denote a limitation of quantity, but rather denote the presence of at least one element. The term of "comprising", "including", or the like, means that the element or item preceding the term contains the element or item listed after the term and the equivalent thereof, but does not exclude the presence of other elements or items. The term "connected", "coupled", or the like is not limited to physical or mechanical connections, but may include electrical connections, whether direct or indirect connections. The terms "upper", "lower", "left", "right", and the like are used merely for indicating relative positional relationships, and when the absolute position of an object being described is changed, the relative positional relationships may also be changed accordingly.

The inventors of the present inventive concept have found that, in the conventional phase shifter with an adjustable dielectric constant, a loss of a transmitted signal is large and a phase shifting degree per unit loss is low. In view of this, embodiments of the present disclosure provide a feeding structure (e.g., a power feeding structure), a microwave radio frequency device including the feeding structure, and an antenna including the microwave radio frequency device, in which the feeding structure has at least advantages of a small loss of a transmitted signal and a high phase shifting degree per unit loss.

It should be noted that the feeding structure provided by the following embodiments of the present disclosure may be widely applied to a differential mode feeding structure with two transmission line layers inside dual substrates, and for example, may be applied to a microwave radio frequency device. In addition, the microwave radio frequency device may be a differential mode signal line, a filter, a phase shifter, or the like. The following embodiments will be described by taking an example in which the microwave radio frequency device is a phase shifter.

Figure 6:
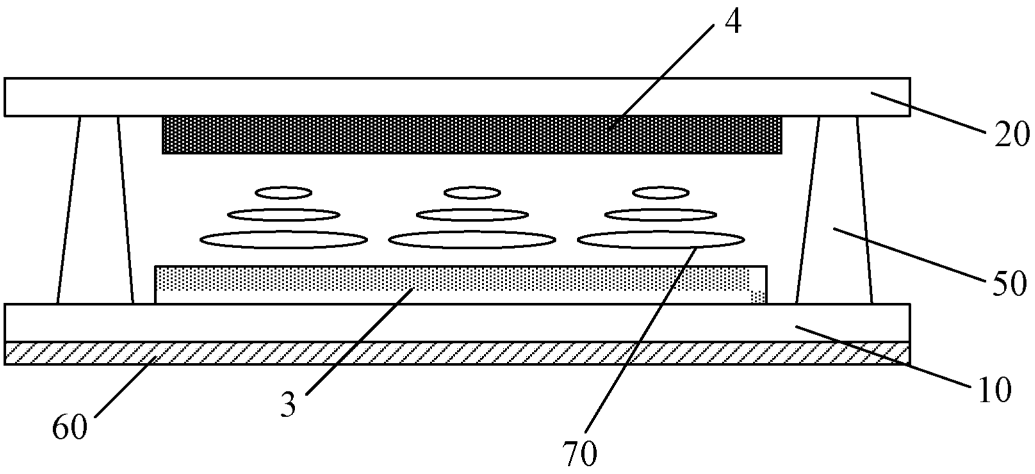
FIG. 6 is a schematic diagram of a phase shifting structure according to an embodiment of the present disclosure.

For example, the phase shifter may include not only a feeding structure (as shown in each of FIGS. 1 to 5 and 7 to 11) but also a phase shifting structure (as shown in FIG. 6). FIG. 6 schematically illustrates a phase shifting structure according to an embodiment of the present disclosure. As shown in FIG. 6, the phase shifting structure includes: a first base plate 10, a second base plate 20, a first transmission line 3 disposed on the first base plate 10, a second transmission line 4 disposed on a side of the second base plate 20 proximal to the first transmission line 3, a dielectric layer disposed between the first transmission line 3 and the second transmission line 4, and a ground electrode 60. The dielectric layer includes, but is not limited to, a liquid crystal layer 70, and the following embodiments will be described by taking an example in which the dielectric layer 70 is the liquid crystal layer.

For example, each of the first transmission line 3 and the second transmission line 4 may be a microstrip (which may also be referred to as a microstrip line), and in this case, the ground electrode 60 may be provided on a side of the first base plate 10 distal to the first transmission line 3. Each of the first transmission line 3 and the second transmission line 4 may be a comb-shaped electrode, and in this case, the ground electrode 60 may be a plate-shaped electrode (i.e., the ground electrode 60 covers the entire surface of the first base plate 10 distal to the first transmission line 3 (e.g., the entire lower surface of the first base plate 10 shown in FIG. 6)). That is, the first transmission line 3, the second transmission line 4, and the ground electrode 60 may form a known microstrip transmission structure. Alternatively, the first transmission line 3, the second transmission line 4, and the ground electrode 60 may form any one of a known stripline transmission structure, a known coplanar waveguide transmission structure, and a known substrate-integrated waveguide transmission structure, and the present disclosure is not limited thereto.

In a first aspect, as shown in FIGS. 1 to 5, some embodiments of the present disclosure provide a feeding structure including a single (i.e., one) feeding unit (e.g., a single power feeding unit). The feeding unit may include a reference electrode 30, a first substrate and a second substrate disposed opposite to each other, and a dielectric layer 40 between the first and second substrates. For example, the first substrate includes a first base plate 10, and a first electrode 1 on the first base plate 10. The first electrode 1 includes a first main body 11 and a plurality of first branches 12, the plurality of first branches 12 are connected to the first main body 11, and spaced apart from each other in a lengthwise direction of the first main body 11; both ends of the first main body 11 are an input terminal (e.g., an input end) ① and a straight-through terminal (e.g., a straight-through end) ②, respectively. For example, the input terminal ① is an end of the first main body 11 proximal to the plurality of first branches 12, and the straight-through terminal ② is an end of the first main body 11 distal to the plurality of first branches 12. The second electrode 2 includes: a second main body 21 and a plurality of second branches 22, the plurality of second branches 22 are connected to the second main body 21, and spaced apart from each other in a lengthwise direction of the second main body 21. Further, the plurality of second branches 22 are in one-to-one correspondence with the plurality of first branches 12. A projection (e.g., an orthographic projection) of each second branch 22 on the first base plate 10 (or the second base plate 20) and a projection (e.g., an orthographic projection) of the first branch 12 corresponding to the second branch 22 on the first base plate 10 (or the second base plate 20) at least partially overlap each other. Both ends of the second main body 21 are a coupling terminal (e.g., a coupling end) ③ and an isolation terminal (e.g., an isolation end) ④, respectively, and the isolation terminal ④ is provided with a matching impedance. For example, the coupling terminal ③ is an end of the second main body 21 proximal to the plurality of second branches 22, and the isolation terminal ④ is an end of the second main body 21 distal to the plurality of second branches 22. The reference electrode 30 forms a current loop with each of the first electrode 1 and the second electrode 2.

In an example, the input terminal ① of the first main body 11 allows a portion of a microwave signal to be output from the straight-through terminal ② and another portion of the microwave signal to be coupled to the plurality of second branches 22 via the plurality of first branches 12. The matching impedance can control at least a part of the portion of the microwave signal coupled to the plurality of second branches 22 to be output from the coupling terminal ③.

It should be understood that, when the feeding structure according to the present embodiment is applied to a phase shifter (or other products such as an antenna), the straight-through terminal ② of the first main body 11 may be connected to the first transmission line 3 of the phase shifting structure, and the coupling terminal ③ of the second main body 21 may be connected to the second transmission line 4 of the phase shifting structure.

In the feeding structure according to the present embodiment, if a microwave signal is input to the input terminal ① of the first main body 11, a portion of the microwave signal is directly input to the first transmission line 3 of the phase shifting structure through the straight-through terminal ② of the first main body 11, and another portion of the microwave signal is coupled to the plurality of second branches 22 through the plurality of first branches 12 and then input to the second transmission line 4 of the phase shifting structure through the coupling terminal ③ of the second main body 21. As such, a certain phase difference can exist between the portions of the microwave signal output from the straight-through terminal ② and the coupling terminal ③, respectively. When different voltages are applied to the first transmission line 3 and the second transmission line 4, respectively, liquid crystal molecules of the liquid crystal layer 70 positioned between the first transmission line 3 and the second transmission line 4 are rotated to change a dielectric constant of the liquid crystal layer 70. In this way, the liquid crystal layer 70 causes the phase difference between the portion of the microwave signal transmitted on the first transmission line 3 and the portion of the microwave signal transmitted on the second transmission line 4 to be further changed, thereby achieving a desired phase shifting degree of the microwave signal.

It should be noted that, the dielectric layer 40 of the feeding unit according to an embodiment of the present disclosure includes, but is not limited to, air, and the embodiments adopted herein are described by taking an example in which the dielectric layer 40 is air. However, an embodiment of the present disclosure is not limited thereto. For example, the dielectric layer 40 may alternatively be an inert gas.

Further, the reference electrode 30 according to the present embodiment may be a ground electrode, but an embodiment of the present disclosure is not limited thereto. For example, the reference electrode 30 may be any electrode having a certain voltage difference with each of the first electrode 1 and the second electrode 2. In the embodiment of the present disclosure, the current loop may refer to that a certain voltage difference exists between each of the first electrode 1 and the second electrode 2 and the ground electrode (i.e., the reference electrode 30), such that the first electrode 1 and the second electrode 2 form capacitance and conductance with the ground electrode, respectively. Meanwhile, the first electrode 1 is coupled to the ground electrode and the first transmission line 3 of the phase shifting structure, respectively, and the second electrode 2 is coupled to the ground electrode and the second transmission line 4 of the phase shifting structure, respectively, so as to transmit the microwave signal, such that a current finally flows back to the ground electrode, i.e., the current loop is formed.

Figure 1:
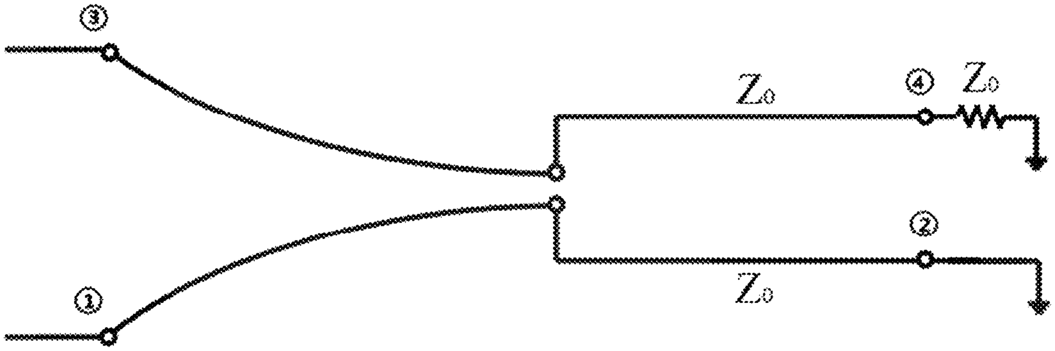
FIG. 1 is a schematic circuit diagram of a feeding structure according to an embodiment of the present disclosure.

In an example, the present embodiment provides a 3 dB feeding structure (i.e., a feeding structure with a power dividing ratio of up to 3 dB). As shown in FIGS. 2 to 5, the feeding structure includes only one feeding unit, and the feeding unit includes a branch overlapping region Q1 and a no-coupling double-line region Q2. Each of the first main body 11 of the first electrode 1 and the second main body 21 of the second electrode 2 of the feeding unit extends through (or passes through or penetrates through) the branch overlapping region Q1 and the no-coupling double-line region Q2, and the plurality of first branches 12 of the first electrode 1 and the plurality of second branches 22 of the second electrode 2 are all located within the branch overlapping region Q1. For example, a portion of the first main body 11 in the branch overlapping region Q1 and a portion of the first main body 11 in the no-coupling double-line region Q2 have a same length of L, and a portion of the second main body 21 in the branch overlapping region Q1 and a portion of the second main body 21 in the no-coupling double-line region Q2 have a same length of L. Further, each of the portion of the first main body 11 in the no-coupling double-line region Q2 and the portion of the second main body 21 in the no-coupling double-line region Q2 has an impedance of $Z_0$, and in this case, the matching impedance connected to the isolation terminal ④ of the second main body 21 is also $Z_0$, thereby ensuring that no energy is output from the isolation terminal ④, as shown in FIG. 1. The plurality of first branches 12 located in the branch overlapping region Q1 are spaced apart from each other and all connected to the first main body 11, and the plurality of second branches 22 located in the branch overlapping region Q1 are spaced apart from each other and all connected to the second main body 21. The plurality of first branches 12 and the plurality of second branches 22 are in one-to-one correspondence with each other, and overlap each other in a direction perpendicular to the first base plate 10 (or the first main body 11 or the second base plate 20 or the second main body 21), respectively. Further, in a direction from the input terminal ① to the straight-through terminal ② of the first main body 11, impedances (e.g., capacitive reactances) of branch circuits formed by the first branches 12 and the second branches 22 respectively overlapping (i.e., corresponding to) the first branches 11 (e.g., each first branch 12 and the second branch 22 corresponding to the first branch 12 may form one branch circuit) are sequentially reduced (i.e., reduced in sequence), such that divided energies of a microwave signal on the impedances of the branch circuits are equal to each other.

Since each of the portion of the first main body 11 and the portion of the second main body 21 in the branch overlapping region Q1 and each of the portion of the first main body 11 and the portion of the second main body 21 in the no-coupling double-line region Q2 have the same length of L, a microwave signal may be input to the plurality of first branches 12 of the first main body 11 via the input terminal ① of the first main body 11 and then be coupled to the plurality of second branches 22 connected to the second main body 21, i.e., the microwave signal may undergo a tight coupling of the length L (i.e., the branch overlapping region Q1), and then undergo a loose coupling of the length L (i.e., the no-coupling double-line region Q2). Next, a portion of the microwave signal on the first electrode 1 is directly output to the first transmission line 3 of the phase shifting structure through the straight-through terminal ② of the first main body 11. Whereas the isolation terminal ④ of the second main body 21 is provided with the matching impedance of $Z_0$, such that a portion of the microwave signal on the second electrode 2 is completely output to the second transmission line 4 of the phase shifting structure through the coupling terminal ③, thereby allowing that the portion of the microwave signal input to the second transmission line 4 has a phase lag (or a phase difference) of 180° than (or from) the portion of the microwave signal input to the first transmission line 3. In addition, since in the direction from the input terminal ① to the straight-through terminal ② of the first main body 11, the impedances (e.g., the capacitive reactances) of the branch circuits formed by the first branches 12 and the second branches 22 respectively overlapping the first branches 11 are sequentially reduced such that divided energies of a microwave signal on the impedances of the branch circuits are equal to each other, equal power division of the microwave signal on the first electrode 1 and the second electrode 2 is achieved.

It should be noted that, the portions of the first main body 11 and the second main body 21 located in the no-coupling double-line region Q2 may be straight-line structures arranged to be parallel to each other, straight-line structures arranged to be non-parallel to each other, or bent structures, and a shape and an arrangement of these portions are not limited in an embodiment of the present disclosure. When the feeding structure is applied to a phase shifter, a matching impedance may also be provided on transmission lines to which the straight-through terminal ② of the first main body 11 and the coupling terminal ③ of the second main body 21 are respectively connected. For example, the straight-through terminal ② of the first main body 11 may be connected to the first transmission line 3 of the phase shifting structure shown in FIG. 6, and the first transmission line 3 may have a matching impedance $Z_0$. In an embodiment, the matching impedance $Z_0$ may be a surface-mounted impedance or a line impedance.

In some embodiments, a power dividing ratio of a microwave signal on the first electrode 1 and the second electrode 2 may be adjusted by adjusting the impedances of the branch circuits formed by the plurality of first branches 12 and the plurality of second branches 22.

For example, for realizing a structure in which the impedances (e.g., the capacitive reactances) of the branch circuits formed by the first branches 12 and the second branches 22 respectively overlapping (i.e., corresponding to) the first branches 12 are sequentially reduced in the direction from the input terminal ① to the straight-through terminal ② of the first main body 11, embodiments of the present disclosure provide the following three specific examples.

Figure 2:
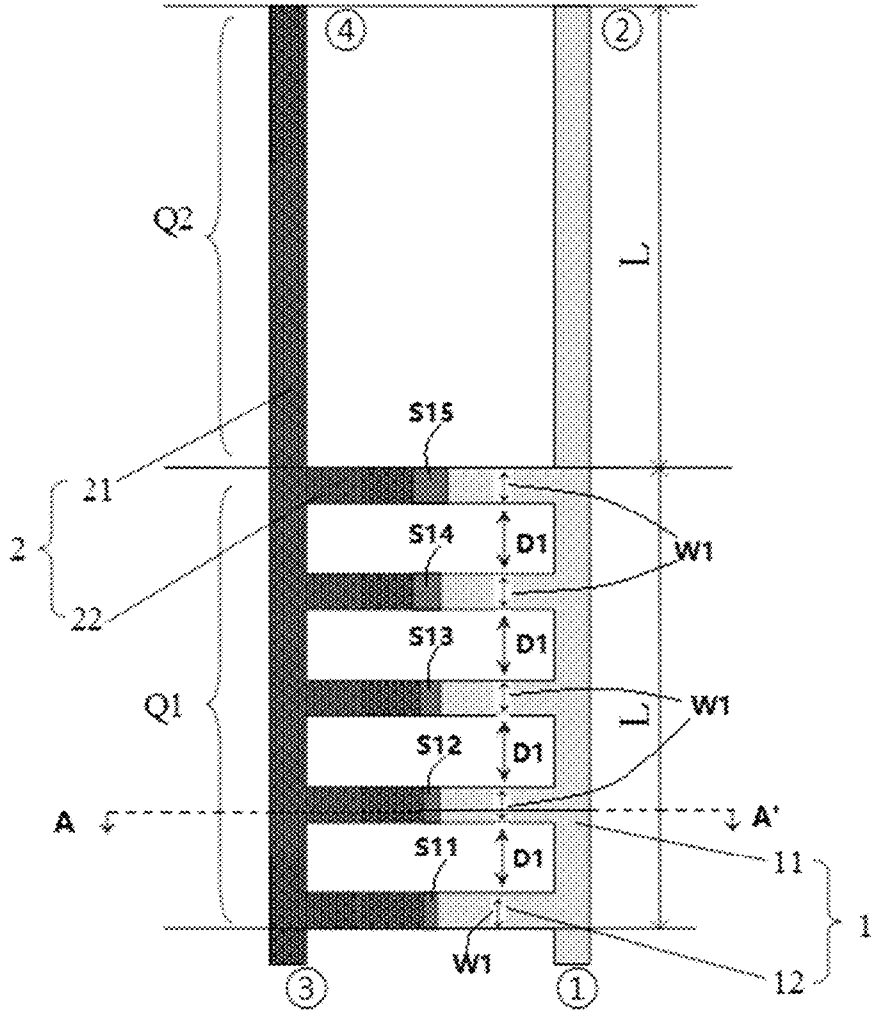
FIG. 2 is a schematic top view of a feeding structure with a single feeding unit according to an embodiment of the present disclosure.

As a first example, as shown in FIG. 2, widths of the first branches 12 and the second branches 22 (e.g., dimensions of the first branches 12 and the second branches 22 in the direction from the input terminal ① to the straight-through terminal ② of the first main body 11, i.e., dimensions thereof in the vertical direction in FIG. 2) are the same (e.g., are all W1). A distance between any adjacent two of the first branches 12 is a constant (e.g., is D1), and a distance between any adjacent two of the second branches 22 is a constant (e.g., is D1). Further, the distance between any adjacent two of the first branches 12 is equal to the distance between any adjacent two of the second branches 22. In the direction from the input terminal ① to the straight-through terminal ② of the first main body 11, overlapping areas of the first branches 12 and the corresponding second branches 22 are sequentially increased (e.g., FIG. 2 shows 5 pairs of the first branches 12 and the second branches 22, i.e., 5 branch circuits; in the direction from the input terminal ① to the straight-through terminal ② of the first main body 11, overlapping areas of the 5 pairs of the first branches 12 and the second branches 22 are S11, S12, S13, S14 and S15, respectively, and S11<S12<S13<S14<S15), such that overlapping capacitances of the branch circuits are sequentially increased, and impedances (e.g., capacitive reactances) of the branch circuits are sequentially decreased, resulting in that energies divided on the branch circuits are equal to each other.

Figure 3:
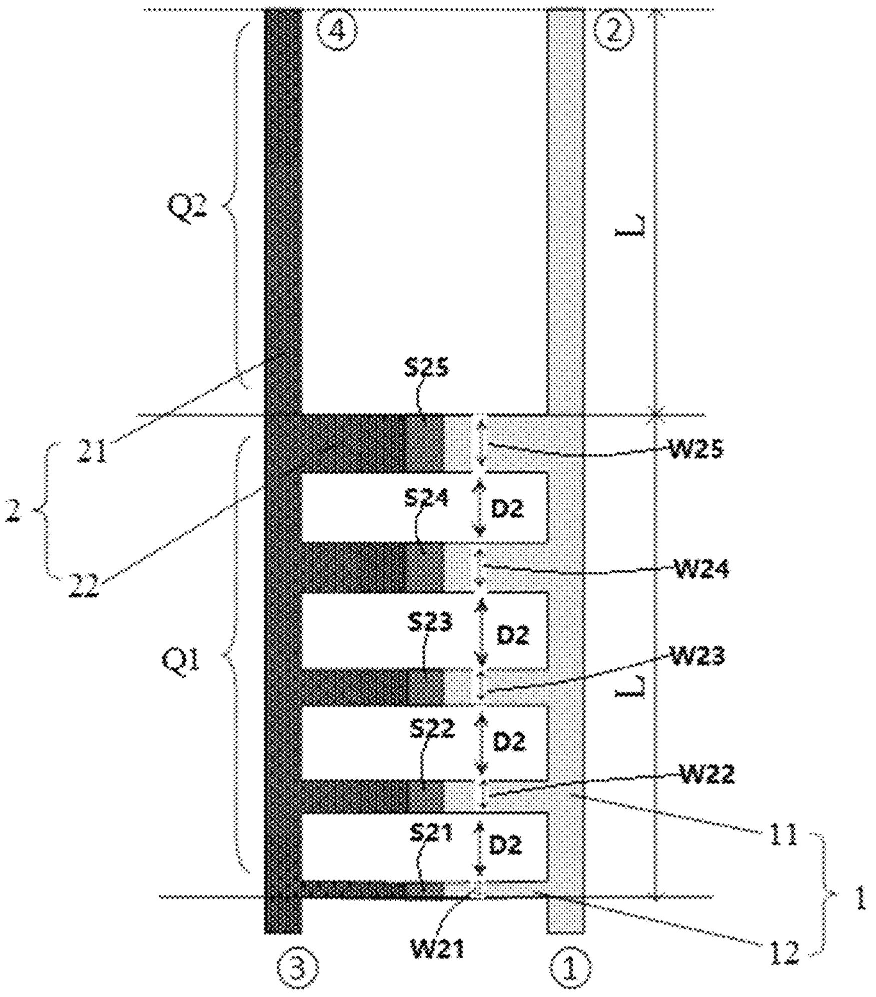
FIG. 3 is a schematic top view of another feeding structure with a single feeding unit according to an embodiment of the present disclosure.

As a second example, as shown in FIG. 3, the widths of the first branches 12 are different (e.g., the widths of 5 first branches 12 shown in FIG. 3 are W21, W22, W23, W24 and W25, respectively, and W21<W22<W23<W24<W25). The width of each first branch 12 is the same as the width of the second branch 22 corresponding to the first branch 12 (in other words, the widths of the second branches 22 are different). The distance between any adjacent two of the first branches 12 is a constant (e.g., is D2), and the distance between any adjacent two of the second branches 22 is a constant (e.g., is D2). In the direction from the input terminal ① to the straight-through terminal ② of the first main body 11, overlapping lengths (e.g., dimensions of the overlapping areas in a direction perpendicular to the direction from the input terminal ① to the straight-through terminal ② of the first main body 11, i.e., dimensions of the overlapping areas in the horizontal direction in FIG. 3) of the first branches 12 and the corresponding second branches 22 are the same, such that the overlapping areas are increased sequentially (e.g., the overlapping areas of 5 pairs of the first branches 12 and the second branches 22 shown in FIG. 3 are S21, S22, S23, S24 and S25, respectively, and S21<S22<S23<S24<S25 in the direction from the input terminal ① to the straight-through terminal ② of the first main body 11). As such, the overlapping capacitances of the branch circuits are increased sequentially, and the impedances (e.g., capacitive reactances) are sequentially decreased, resulting in that energies divided on the branch circuits are equal to each other.

Figure 4:
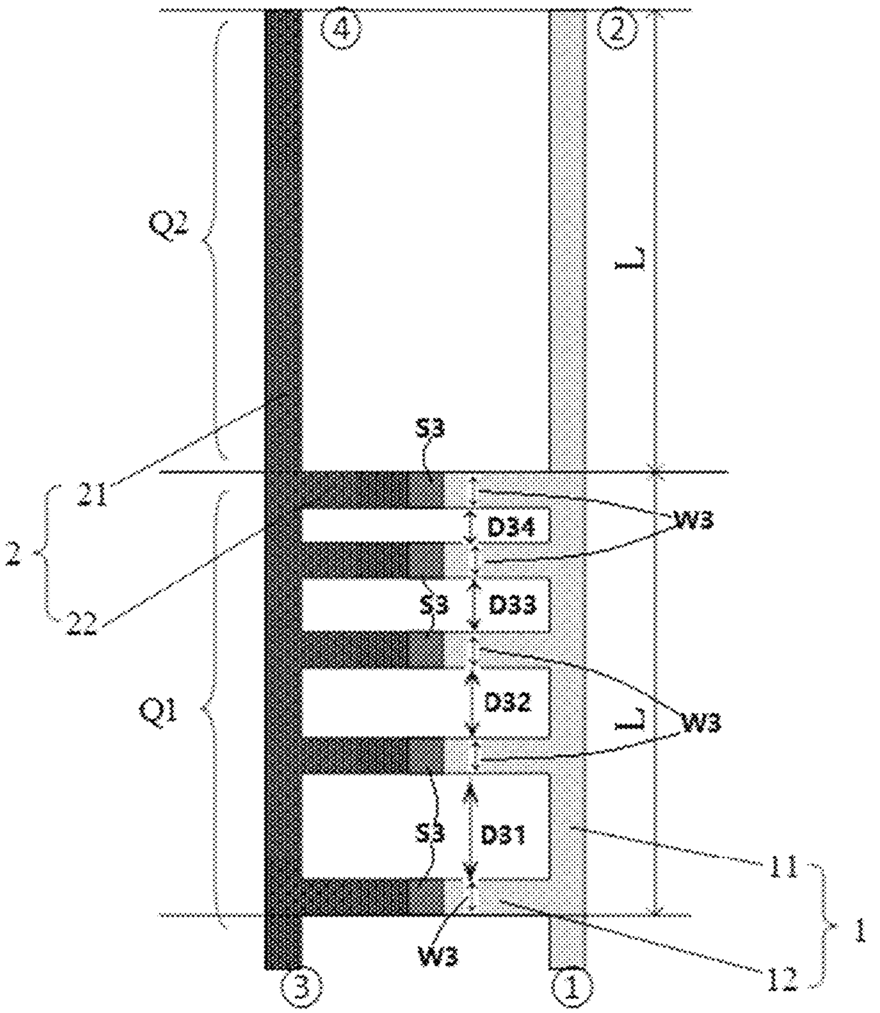
FIG. 4 is a schematic top view of yet another feeding structure with a single feeding unit according to an embodiment of the present disclosure.
Figure 5:
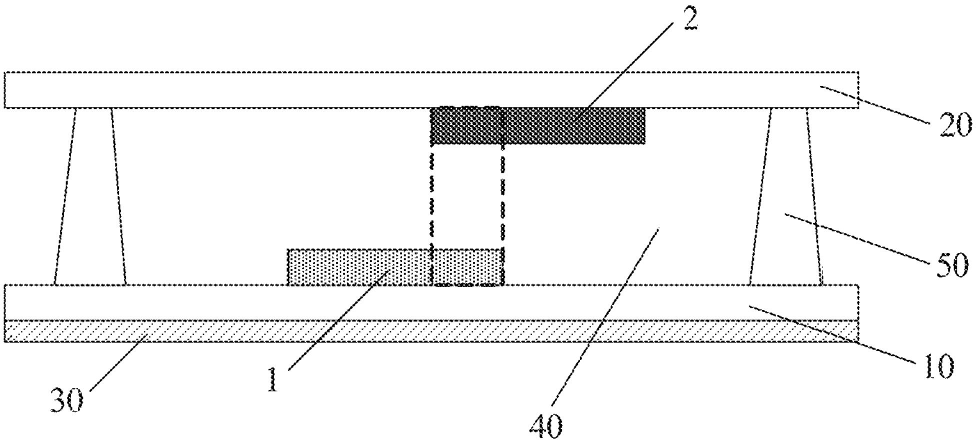
FIG. 5 is a schematic side view of a feeding structure with a single feeding unit according to an embodiment of the present disclosure, and for example, FIG. 5 may be a schematic cross-sectional view of the feeding structure shown in FIG. 2 taken along a line AA'.

As a third example, as shown in FIG. 4, the widths of the first branches 12 and the widths of the second branches 22 are a constant (e.g., are W3). In the direction from the input terminal ① to the straight-through terminal ②, the distances between every adjacent two of the first branches 12 are sequentially decreased (e.g., the distances between every adjacent two of 5 first branches 12 shown in FIG. 4 are D31, D32, D33 and D34, respectively, and D31>D32>D33>D34), and the overlapping lengths of the first branches 12 and the corresponding second branches 22 are the same (e.g., the overlapping areas of 5 pairs of first branches 12 and the second branches 22 shown in FIG. 4 may all be S3), such that the impedances of the branch circuits are gradually decreased, resulting in that energies divided on the branch circuits are equal to each other.

In some embodiments, the first electrode 1, the second electrode 2, and the reference electrode 30 may form any one of a microstrip transmission structure, a stripline transmission structure, a coplanar waveguide transmission structure, and a substrate-integrated waveguide transmission structure that are known.

In some embodiments, one or more support members 50 may be further disposed between the first substrate and the second substrate of the feeding unit, to maintain a distance between the first substrate and the second substrate.

In some embodiments, each of the first base plate 10 and the second base plate 20 may be a glass base plate having a thickness of 100 μm to 1,000 μm, may be a sapphire base plate (having a thickness of 100 μm to 1,000 μm), or may be any one of a polyethylene terephthalate base plate having a thickness of 10 μm to 500 μm, a triallyl cyanurate base plate having a thickness of 10 μm to 500 μm, and a transparent flexible polyimide base plate having a thickness of 10 μm to 500 μm. As such, a loss of a microwave can be effectively reduced, such that a phase shifter has a low power consumption and a high signal-to-noise ratio. Alternatively, each of the first base plate 10 and the second base plate 20 may be made of high-purity quartz glass having an extremely low dielectric loss. For example, the high-purity quartz glass may refer to quartz glass in which a weight percentage of $SiO_2$ is greater than or equal to 99.9%. Compared with a general glass base plate, the first base plate 10 and/or the second base plate 20 may be high-purity quartz glass base plate(s), such that the loss of the microwave can be reduced more effectively, and the phase shifter can have a lower power consumption and a higher signal-to-noise ratio.

In some embodiments, a material of each of the first electrode 1, the second electrode 2, the first transmission line 3, and the second transmission line 4 may be a metal such as aluminum, silver, gold, chromium, molybdenum, nickel, iron, or the like. Alternatively, the first transmission line 3 and/or the second transmission line 4 may be made of a transparent conductive oxide (e.g., indium tin oxide (ITO)), which can improve light transmittance(s) of the first transmission line 3 and/or the second transmission line 4.

In some embodiments, the reference electrode 30, i.e., the ground electrode, of the feeding unit may be disposed on the side of the first base plate 10 distal to the second base plate 20, or on a side of the second base plate 20 distal to the first base plate 10. Alternatively, a third base plate 90 (see FIG. 11) may be further provided opposite to any one of the first base plate 10 and the second base plate 20, and the reference electrode 30 may be disposed on the third base plate 90.

In some embodiments, the liquid crystal molecules of the liquid crystal layer 70 may be positive liquid crystal molecules or negative liquid crystal molecules. It should be noted that, in a case where the liquid crystal molecules are the positive liquid crystal molecules, in an embodiment of the present disclosure, an angle between a long axis direction of each liquid crystal molecule and a plane where the first base plate 10 or the second base plate 20 is located is greater than 0 (zero) degrees and is less than or equal to 45 degrees. In a case where the liquid crystal molecules are the negative liquid crystal molecules, in an embodiment of the present disclosure, an angle between the long axis direction of each liquid crystal molecule and the plane where the first base plate 10 or the second base plate 20 is located is greater than 45 degrees and less than 90 degrees. As such, it is ensured that the dielectric constant of the liquid crystal layer 70 is changed more effectively after the liquid crystal molecules are rotated, thereby achieving the purpose of phase shifting.

In an embodiment, the first base plate 10 of the phase shifting structure shown in FIG. 6 and the first base plate 10 of the feeding structure shown in any one of FIGS. 2 to 4 may be connected to each other or have a one-piece structure (i.e., may include a same material), and the second base plate 20 of the phase shifting structure shown in FIG. 6 and the second base plate 20 of the feeding structure shown in any one of FIGS. 2 to 4 may be connected to each other or have a one-piece structure (i.e., may include a same material).

In an embodiment, the plurality of first branches 12 may be located in a same plane, and the plurality of second branches 22 may be located in a same plane. In an embodiment, the plane in which the plurality of first branches 12 are located may be different from the plane in which the plurality of second branches 22 are located.

Figure 7:
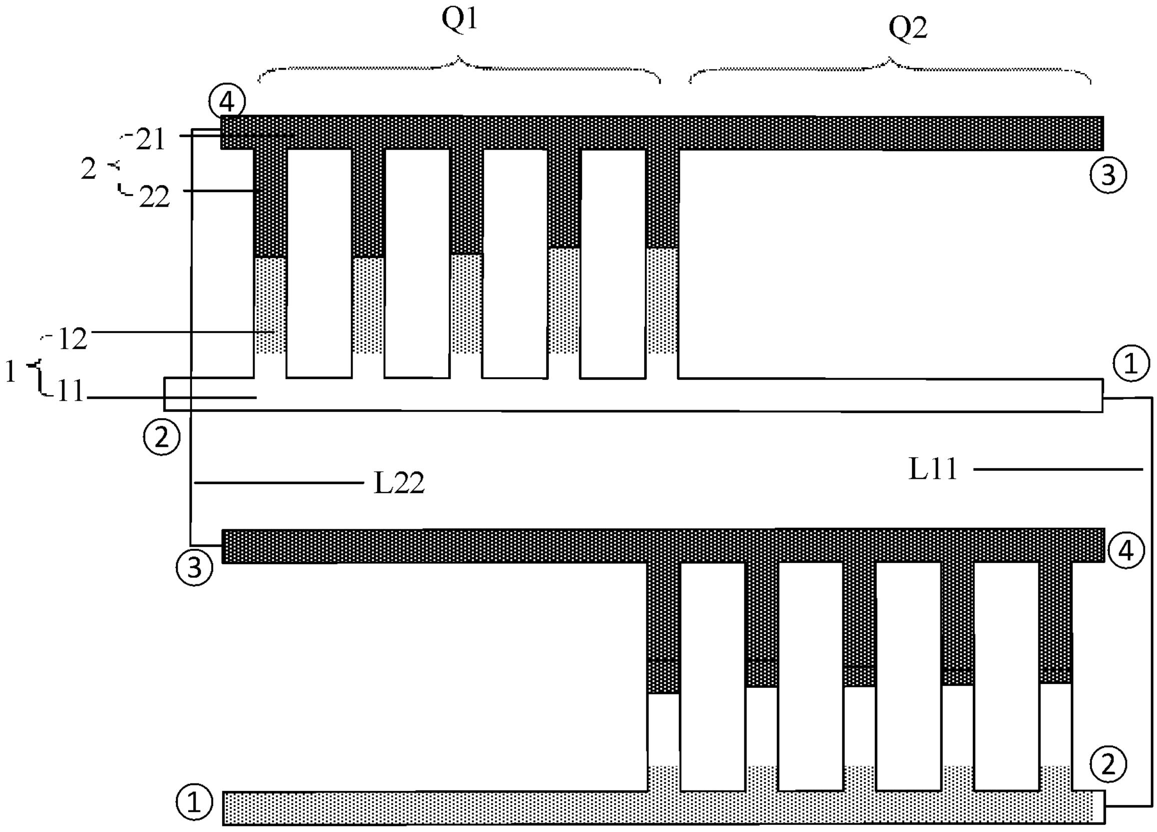
FIG. 7 is a schematic diagram of a feeding structure with two feeding units according to an embodiment of the present disclosure.

In a second aspect, as shown in FIGS. 7 to 11, some embodiments of the present disclosure further provide a feeding structure including two feeding units cascaded in respective stages, which are a first-stage feeding unit (or referred to as a first feeding unit, e.g., the lower feeding unit in FIG. 7) and a second-stage feeding unit (or referred to as a second feeding unit, e.g., the upper feeding unit in FIG. 7). In the feeding structure shown in FIGS. 7 and 8, each feeding unit may be the feeding structure according to any one of the embodiments of FIGS. 2 to 4. In the first-stage feeding unit and the second-stage feeding unit of the feeding structure, the straight-through terminal ② of the first main body 11 of the first-stage feeding unit may be connected to the input terminal ① of the first main body 11 of the second-stage feeding unit, and the coupling terminal ③ of the second main body 21 of the first-stage feeding unit may be connected to the isolation terminal ④ of the second main body 21 of the second-stage feeding unit.

In some embodiments, the straight-through terminal ② of the first main body 11 of the first-stage feeding unit is connected to the input terminal ① of the first main body 11 of the second-stage feeding unit through a first signal line L11, and the coupling terminal ③ of the second main body 21 of the first-stage feeding unit is connected to the isolation terminal ④ of the second main body 21 of the second-stage feeding unit through a second signal line L22. For example, the first main body 11 of the first-stage feeding unit, the first main body 11 of the second-stage feeding unit, and the first signal line L11 may be disposed in a same layer and include a same material, and the second main body 21 of the first-stage feeding unit, the second main body 21 of the second-stage feeding unit, and the second signal line L22 may be disposed in a same layer and include a same material. In this way, the first electrodes 1 of the feeding units in two stages and the first signal line L11 can be formed by one patterning process, and the second electrodes 2 of the feeding units in the two stages and the second signal line L22 can be formed by one patterning process, thereby improving the production efficiency thereof and reducing the cost thereof.

For such a structure, it should be noted that in a case where a linewidth of each component (e.g., the first main body 11 or the second main body 21 or each first branch 12 or each second branch 22) is small and a magnitude of each overlapping capacitance is small, the influence of a displacement capacitance can be minimized by design, so as to avoid a problem of bandwidth reduction caused by changing a layer of a signal line twice (e.g., see a third signal line 80 shown in FIG. 10 or 11) in a technical solution with through holes.

Figure 8:
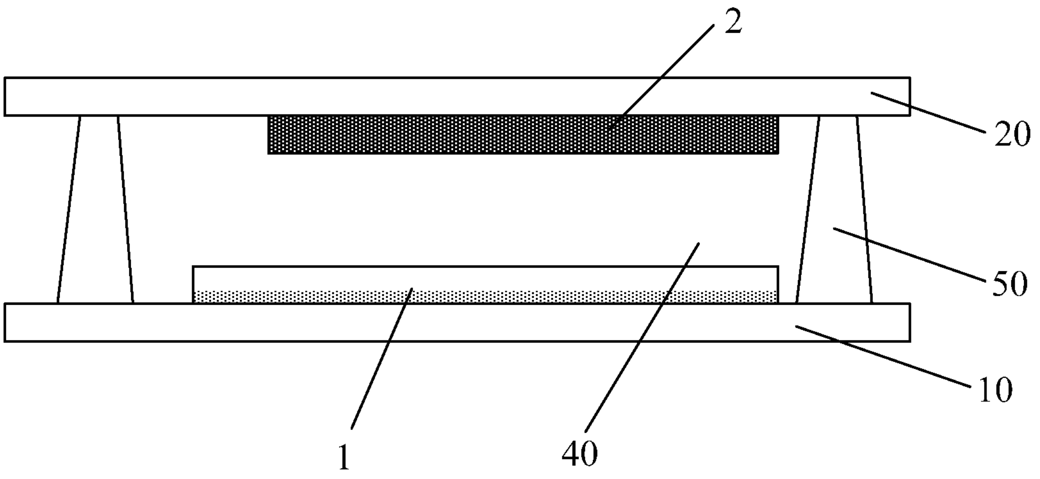
FIG. 8 is a schematic side view of the feeding structure shown in FIG. 7.
Figure 9:
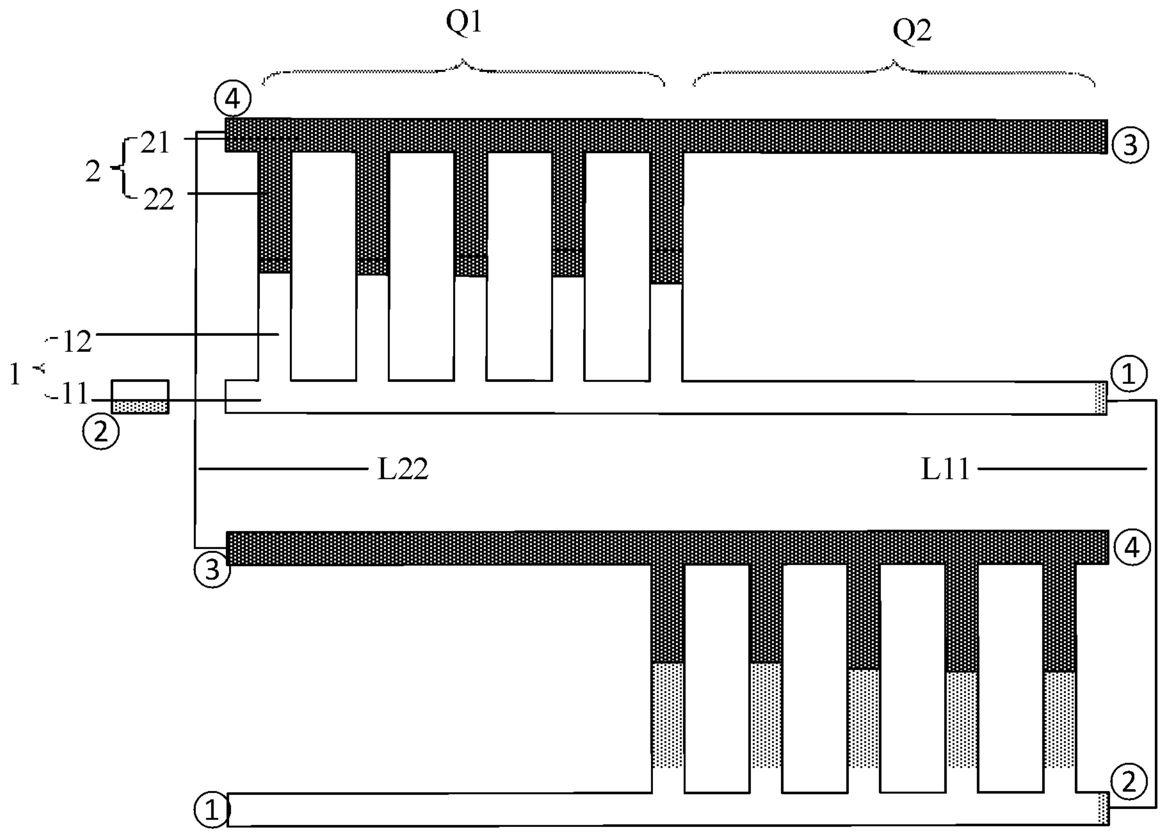
FIG. 9 is a schematic diagram of another feeding structure with two feeding units according to an embodiment of the present disclosure.
Figure 10:
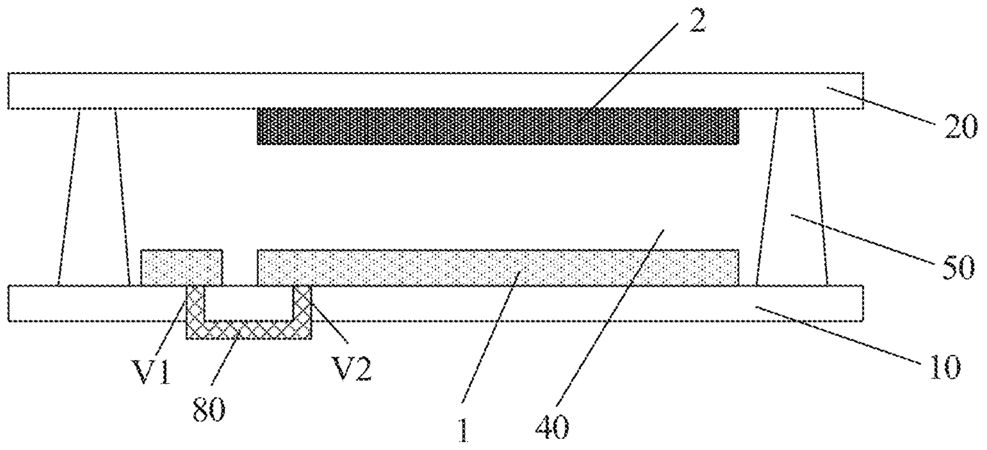
FIG. 10 is a schematic side view of the feeding structure shown in FIG. 9.

In some embodiments, the feeding structure shown in FIGS. 9 and 10 is similar to the feeding structure shown in FIGS. 7 and 8, and differences therebetween lie in that: in the feeding structure shown in FIGS. 9 and 10, the first main body 11 of the second-stage feeding unit is discontinuous (e.g., disconnected) at a position overlapping the second signal line L22, and through holes (e.g., a through hole V1 and a through hole V2 shown in FIG. 10) are formed in the first base plate 10; further, the third signal line 80 connects portions, which are spaced apart from each other at the position overlapping (i.e., corresponding to) the second signal line, of the first main body 11 of the second-stage feeding unit to each other through the through hole V1 and the through hole V2, as shown in FIG. 10. As such, it is possible to avoid a problem of mutual interference of displacement currents caused by a too small distance between the second signal line and the position, which overlaps the second signal line, of the first main body 11 of the second-stage feeding unit.

Figure 11:
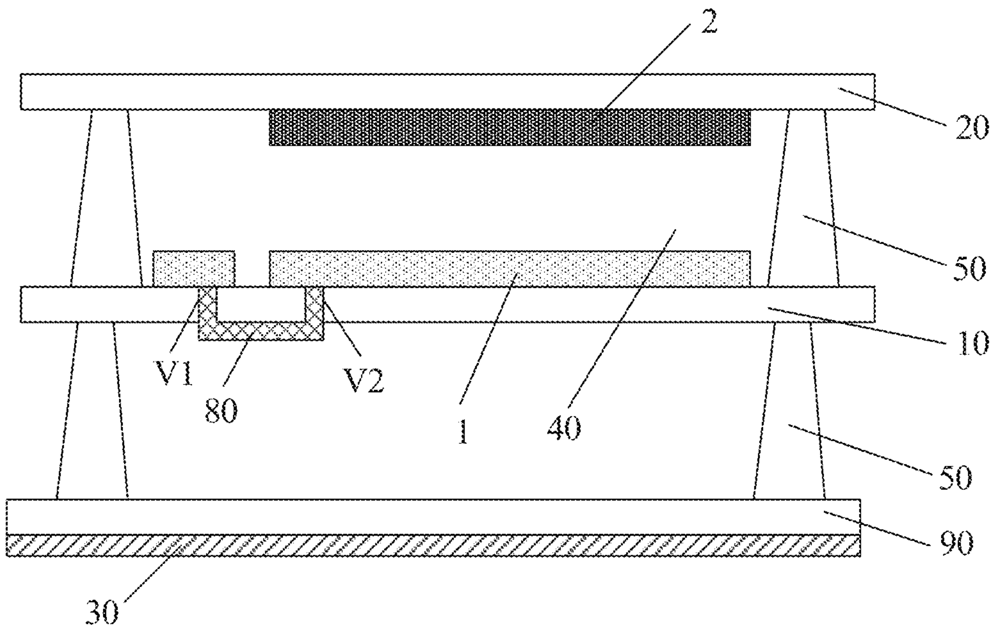
FIG. 11 is another schematic side view of the feeding structure shown in FIG. 9.

In some embodiments, as shown in FIG. 11, the feeding structure may further include the third base plate 90 located on a side of the first base plate 10 distal to the second base plate 20 and disposed opposite to the first base plate 10. In this case, the reference electrode 30 may be located on a side of the third base plate 90 distal to the first base plate 10, to prevent an impedance of a transmission line on the side of the first base plate 10 distal to the first electrode 1 from being too small.

The connections between the respective feeding units according to the present embodiment may be similar to those in the embodiments of FIG. 7 or 9. Meanwhile, it should be understood that the number of the feeding units according to the present embodiment is not limited to 2 as shown in the figures, and 3 or more feeding units may be connected to each other according to practical requirements in the connection manner between the respective feeding units as shown in the embodiments of FIG. 7 or 9, to form a feeding structure having a plurality of feeding units.

In an embodiment, as shown in FIGS. 7 and 8, the first electrode 1 of the first-stage feeding unit and the first electrode 1 of the second-stage feeding unit may be disposed on a same first base plate 10 and spaced apart from and aligned with each other, such that the first electrode 1 of the first-stage feeding unit and the first electrode 1 of the second-stage feeding unit overlap each other (i.e., only one first electrode 1 is seen) in the viewing direction shown in FIG. 8. The second electrodes 2 of the first-stage feeding unit and the second-stage feeding unit may be disposed on a same second base plate 20 and spaced apart from and aligned with each other, such that the second electrodes 2 of the first-stage feeding unit and the second-stage feeding unit overlap each other (i.e., only one second electrode 2 is seen) in the viewing direction shown in FIG. 8. Further, two or more feeding units of the feeding structure shown in each of FIGS. 9 to 11 may also be arranged in such a way.

In an example of the present embodiment, the overlapping area of each first branch 12 and the corresponding second branch 22 in a single feeding unit may be adjusted such that each feeding unit may be realized as a feeding unit having a power dividing ratio of 8.34 dB and a phase difference of 180°, and the functions of a feeding unit having a power dividing ratio of 3 dB and a phase difference of 180° may be realized by cascading two feeding units each having the power dividing ratio of 8.34 dB and the phase difference of 180° to each other. In addition, for the feeding unit having the power dividing ratio of 3 dB and the phase difference of 180° realized by cascading the two feeding units each having the power dividing ratio of 8.34 dB and the phase difference of 180° to each other, a bandwidth thereof can be much greater than a bandwidth of each of the two feeding units each having the power dividing ratio of 8.34 dB and the phase difference of 180°, without a strong coupling between two feeding units to realize the power dividing ratio of 3 dB, thereby having a high degree of design freedom.

In a third aspect, an embodiment of the present disclosure provides a microwave radio frequency device, which includes the feeding structure according to any one of the foregoing embodiments. For example, the microwave radio frequency device may include, but is not limited to, a filter or a phase shifter.

In a fourth aspect, an embodiment of the present disclosure provides a liquid crystal antenna, which includes the phase shifter according to any one of the foregoing embodiments. For example, in the phase shifting structure (as shown in FIG. 6) of the phase shifter (i.e., the microwave radio frequency device) of the liquid crystal antenna, at least two patch units (not shown in the figures) are further disposed on a side of the second base plate 20 distal to the liquid crystal layer 70, and a gap between any adjacent two of the patch units corresponds to a gap between adjacent two of the first branches 12 (or between adjacent two second branches 22 corresponding to the adjacent two first branches 12). As such, a microwave signal which is subjected to phase adjustment by the phase shifter according to any one of the foregoing embodiments can be radiated outward from the gap between any adjacent two of the patch units.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the scope of the present disclosure as defined in the appended claims, and such changes and modifications also fall within the scope of the present disclosure.

What is claimed is:

1. A feeding structure, comprising a feeding unit, the feeding unit comprising: a reference electrode, a first substrate and a second substrate opposite to each other, and a dielectric layer between the first substrate and the second substrate, wherein the first substrate comprises a first base plate and a first electrode on the first base plate; the first electrode comprises a first main body and a plurality of first branches, the plurality of first branches are connected to the first main body and spaced apart from each other in a lengthwise direction of the first main body, and both ends of the first main body are an input terminal and a straight-through terminal, respectively;

the second substrate comprises a second base plate and a second electrode on the second base plate; the second electrode comprises a second main body and a plurality of second branches, the plurality of second branches are connected to the second main body, spaced apart from each other in a lengthwise direction of the second main body, and in one-to-one correspondence with the plurality of first branches; an orthographic projection of each second branch on the first base plate partially overlaps an orthographic projection of a corresponding first branch on the first base plate; both ends of the second main body are a coupling terminal and an isolation terminal, respectively, and the isolation terminal is provided with a matching impedance;

the input terminal of the first main body allows a portion of a microwave signal to be output from the straight-through terminal, and another portion of the microwave signal to be coupled to the plurality of second branches via the plurality of first branches; the matching impedance is for controlling at least a part of the portion of the microwave signal coupled to the plurality of second branches to be output from the coupling terminal; and the reference electrode forms a current loop with the first electrode and the second electrode, respectively.

2. The feeding structure according to claim 1, wherein the feeding unit comprises a branch overlapping region and a no-coupling double-line region;

the plurality of first branches and the plurality of second branches are all in the branch overlapping region;

the first main body and the second main body both extend through the branch overlapping region and the no-coupling double-line region, a portion of the first main body in the branch overlapping region has a length equal to a length of a portion of the first main body in the no-coupling double-line region, and a portion of the second main body in the branch overlapping region has a length equal to a length of a portion of the second main body in the no-coupling double-line region; and the portion of the second main body in the no-coupling double-line region has an impedance equal to the matching impedance.

3. The feeding structure according to claim 1, wherein impedances of branch circuits formed by the plurality of first branches and the plurality of second branches respectively overlapping the plurality of first branches are sequentially decreased in a direction from the input terminal to the straight-through terminal.

4. The feeding structure according to claim 1, wherein the plurality of first branches and the plurality of second branches have a same width; and in a direction from the input terminal to the straight-through terminal, a distance between any adjacent two of the plurality of first branches is a fixed value, and overlapping areas of the plurality of first branches and the plurality of second branches are sequentially increased.

5. The feeding structure according to claim 1, wherein each first branch and a corresponding second branch have a same width; and in a direction from the input terminal to the straight-through terminal, a distance between any adjacent two of the plurality of first branches is a fixed value, both widths of the plurality of first branches and widths of the plurality of second branches are sequentially increased, and overlapping lengths of the plurality of first branches and the plurality of second branches are equal to each other.

6. The feeding structure according to claim 1, wherein the plurality of first branches and the plurality of second branches have a same width; and in a direction from the input terminal to the straight-through terminal, distances between every pairs of adjacent two of the plurality of first branches are sequentially reduced, and overlapping lengths of the plurality of first branches and the plurality of second branches are equal to each other.

7. The feeding structure according to claim 1, wherein the feeding structure comprises two feeding units each of which is the feeding unit, the two feeding units being cascaded in respective stages, wherein the straight-through terminal of the first main body of a first-stage feeding unit is connected to the input terminal of the first main body of a second-stage feeding unit; and the coupling terminal of the second main body of the first-stage feeding unit is connected to the isolation terminal of the second main body of the second-stage feeding unit.

8. The feeding structure according to claim 7, further comprising a first signal line and a second signal line, wherein the straight-through terminal of the first main body of the first-stage feeding unit is connected to the input terminal of the first main body of the second-stage feeding unit through the first signal line;

the coupling terminal of the second main body of the first-stage feeding unit is connected to the isolation terminal of the second main body of the second-stage feeding unit through the second signal line;

the first main body of the first-stage feeding unit, the first main body of the second-stage feeding unit, and the first signal line are in a same layer and comprise a same material; and the second main body of the first-stage feeding unit, the second main body of the second-stage feeding unit, and the second signal line are in a same layer and comprise a same material.

9. The feeding structure according to claim 8, further comprising through holes and a third signal line, wherein the first main body of the second-stage feeding unit is discontinuous at a position overlapping the second signal line;

the through holes are in the first base plate; and the third signal line connects portions, which are spaced apart from each other at the position overlapping the second signal line, of the first main body of the second-stage feeding unit to each other through the through holes.

10. The feeding structure according to claim 9, further comprising a third base plate which is on a side of the first base plate distal to the second base plate and is opposite to the first base plate, wherein the reference electrode is on a side of the third base plate distal to the first base plate.

11. The feeding structure according to claim 1, wherein the reference electrode is on a side of the first base plate distal to the second base plate.

12. The feeding structure according to claim 1, wherein the first electrode, the second electrode, and the reference electrode form any one of a microstrip transmission structure, a stripline transmission structure, a coplanar waveguide transmission structure, and a substrate-integrated waveguide transmission structure; and/or the feeding structure further comprises a support member between the first substrate and the second substrate, for maintaining a distance between the first substrate and the second substrate; and/or wherein the dielectric layer comprises air or an inert gas.

13. The feeding structure according to claim 1, wherein the input terminal is an end of the first main body proximal to the plurality of first branches, and the straight-through terminal is an end of the first main body distal to the plurality of first branches; and the coupling terminal is an end of the second main body proximal to the plurality of second branches, and the isolation terminal is an end of the second main body distal to the plurality of second branches.

14. The feeding structure according to claim 1, wherein the first electrode is between the dielectric layer and the first base plate, and the second electrode is between the dielectric layer and the second base plate.

15. A microwave radio frequency device, comprising the feeding structure according to claim 1.

16. The microwave radio frequency device according to claim 15, further comprising a phase shifting structure, which comprises:

a fourth base plate and a fifth base plate opposite to each other;

a first transmission line on the fourth base plate;

a second transmission line on a side of the fifth base plate proximal to the first transmission line;

a liquid crystal layer between the first transmission line and the second transmission line; and a ground electrode on a side of the fourth base plate distal to the first transmission line.

17. The microwave radio frequency device according to claim 16, wherein at least one of the first transmission line and the second transmission line is a microstrip; and/or wherein each of the first transmission line and the second transmission line is a comb-shaped electrode, and the ground electrode is a plate-shaped electrode; and/or wherein the straight-through terminal of the feeding structure is connected to the first transmission line of the phase shifting structure, and the coupling terminal of the feeding structure is connected to the second transmission line of the phase shifting structure.

18. The microwave radio frequency device according to claim 16, wherein the liquid crystal layer comprises positive liquid crystal molecules or negative liquid crystal molecules;

an angle between a long axis direction of each positive liquid crystal molecule and a plane where the fourth base plate is located is greater than 0 degrees and less than or equal to 45 degrees; and an angle between a long axis direction of each negative liquid crystal molecule and the plane where the fourth base plate is located is greater than 45 degrees and less than 90 degrees.

19. The microwave radio frequency device according to claim 15, wherein the microwave radio frequency device comprises a phase shifter or a filter.

20. An antenna, comprising the microwave radio frequency device according to claim 15.

* * * * *